United States Patent
Morales

(10) Patent No.: US 11,960,947 B2
(45) Date of Patent: Apr. 16, 2024

(54) METHODS AND PRINTING SYSTEM USING ACCELERATED CONSUMABLE USE ESTIMATION IN PRINTING OPERATIONS

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/851,329

(22) Filed: Jun. 28, 2022

(65) Prior Publication Data

US 2023/0419066 A1  Dec. 28, 2023

(51) Int. Cl.
  *G06F 3/12* (2006.01)
  *G06K 15/00* (2006.01)
  *G06K 15/02* (2006.01)

(52) U.S. Cl.
  CPC ..... *G06K 15/1823* (2013.01); *G06K 15/1815* (2013.01); *G06K 15/407* (2013.01)

(58) Field of Classification Search
  CPC ........... G06K 15/1823; G06K 15/1815; G06K 15/407; G06F 3/1219; G06F 3/1239; G06F 2206/1504; G06F 3/1296; G06F 3/1229; G06F 3/1237; B41J 2/17566; B41J 2002/17569; H04N 1/605
  See application file for complete search history.

(56) References Cited

U.S. PATENT DOCUMENTS

| | | | |
|---|---|---|---|
| 2006/0233587 A1* | 10/2006 | Vondran, Jr. ......... | B41J 2/17566 347/7 |
| 2018/0065376 A1* | 3/2018 | Sakurai ................ | B41J 2/17566 |
| 2018/0081601 A1* | 3/2018 | Tapuchievici ..... | G06K 15/1836 |

* cited by examiner

*Primary Examiner* — Iriana Cruz
(74) *Attorney, Agent, or Firm* — Millen, White, Zelano & Branigan P.C.; William F. Nixon

(57) ABSTRACT

Variable data printing operations use static and variable content to create many different documents. An estimation system for printing operations implements accelerated consumable use estimation for variable data printing operations by tagging reused objects having static content. The static content is rendered within the estimation system once and then stored for use in later estimation operations, as needed. Variable content is rendered for each record. Using this process, the estimation system does not need to render reused content repeatedly in providing consumable use estimates.

12 Claims, 11 Drawing Sheets

METHODS AND PRINTING SYSTEM USING ACCELERATED CONSUMABLE USE ESTIMATION IN PRINTING OPERATIONS

FIELD OF THE INVENTION

The present invention relates to a printing system and associated methods to estimate consumable use in printing operations. More particularly, the present invention uses accelerated consumable use estimation process for print jobs using an estimation system.

DESCRIPTION OF THE RELATED ART

Consumable use estimation requires rendering a print job and then further processing the raster data to determine actual consumable use. Consumable use may cover ink use and toner use. The process especially may be time consuming for offline consumable use estimation that is done on computers that are not as powerful as the digital front ends (DFEs) that raster image process for production printing devices. Further, offline consumable use estimation does not use hardware acceleration that may be found in a DFE. This makes the process even more time consuming.

SUMMARY OF THE INVENTION

A method for accelerated consumable use estimation in a printing system is disclosed. The method includes receiving a request for a consumable use estimation at an estimation system connected to a printing device within the printing system. The method also includes rendering variable content within a document for a print job. The method also includes estimating a variable consumable estimate based on the variable content for the print job. The method also includes processing static content within the document for the print job. The static content is associated with a static consumable estimate stored at the estimation system. The method also includes determining the consumable use estimate for the print job according to the dynamic consumable estimate and the static consumable estimate.

A method for estimating use of a consumable for printing a print job using variable data printing operations. The method includes receiving a document for the print job at an estimation system. The document includes variable content and static content used in a variable data printing application. The method also includes determining a first block of content is static content according to metadata associated with the first block of content. The method also includes retrieving a static consumable use for the first block of content stored at the estimation system. The static consumable estimate is generated for the static content using the static consumable use for the first block of content. The method also includes determining a second block of content using variable content within the document. The method also includes estimating a variable consumable estimate based on the variable content of the second block of content. The method also includes calculating a consumable use estimate for the print job using the static consumable estimate for the first block of content and the variable consumable estimate for the second block of content.

An estimation system for a printing system is disclosed. The estimation system includes a processor. The estimation system also includes a memory connected to the processor. The memory includes instructions to configure the processor to receive a request for a consumable use estimate for a print job to a printing device within the printing system. The instructions also configure the processor to render variable content within a document for the print job. The instructions also configure the processor to estimate a variable consumable estimate based on the variable content for the print job. The instructions also configure the processor to process static content within the document for the print job. The static content is associated with a static consumable estimate stored at the estimation system. The instructions also configure the processor to determine the consumable use estimate for the print job according to the dynamic consumable estimate and the static consumable estimate.

A method for accelerated consumable use estimation for variable data printing operations is disclosed. The method includes providing a print job to an estimation system within a printing system for performing variable data printing operations. The print job includes a plurality of records. At least one record uses a set of pages having static content. The method also includes receiving a current record of the plurality of records. The current record includes at least one page of the set of pages. The method also includes retrieving a stored consumable use for the at least one page at the estimation system. The method also includes adding the stored consumable use to a total consumable use for the current record. The method also includes calculating a consumable use estimate for the current record based on the total consumable use.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
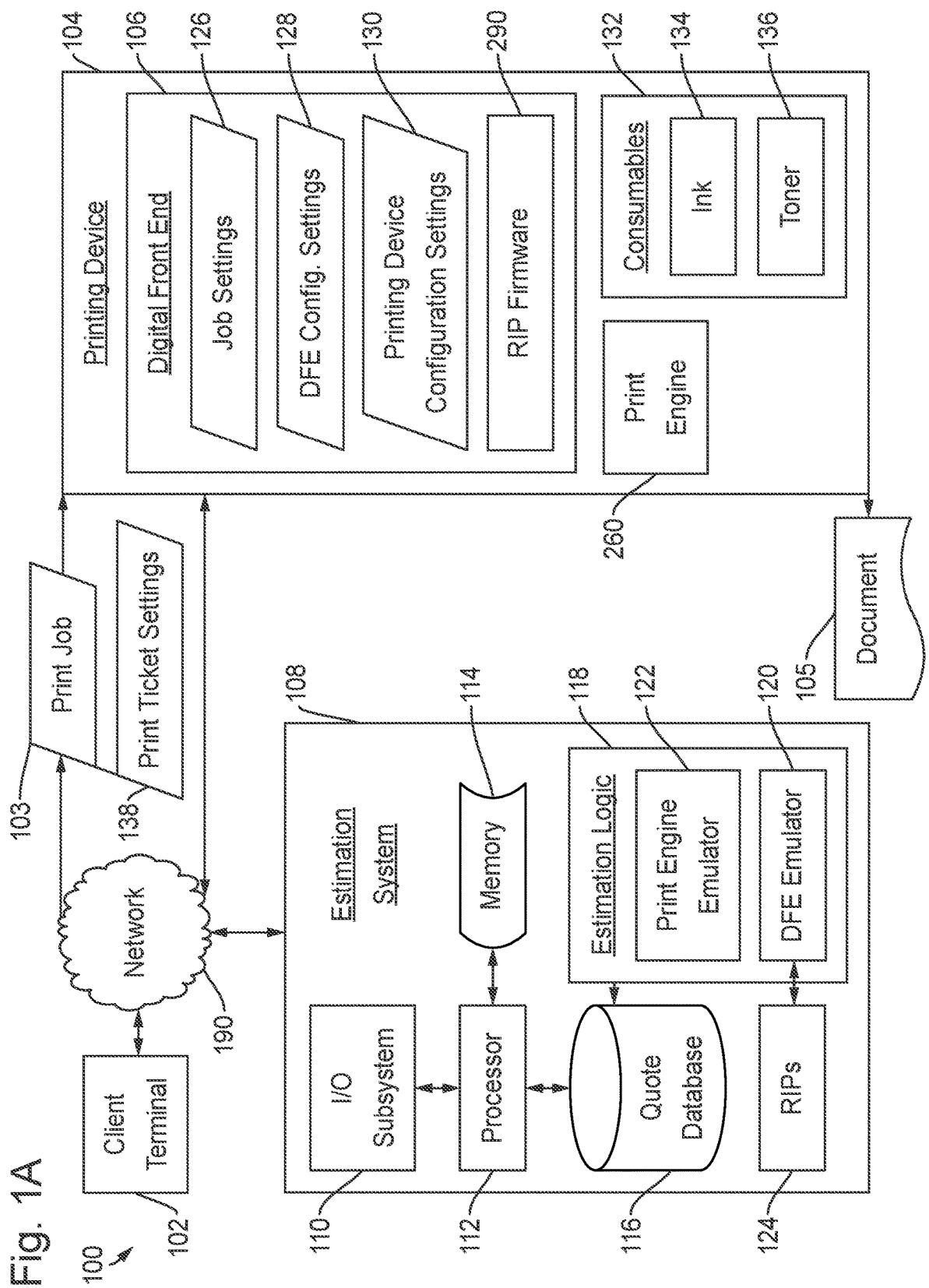
FIG. 1A illustrates a printing system for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide an enhancement to consumable use estimation, offline consumable use estimation in particular. The disclosed embodiments improve performance at the cost of slightly reduced consumable use estimation accuracy. The term "offline" consumable estimation refers to the fact that the estimation processes occur apart from the printing device, preferably at an estimation system. As disclosed below, estimation system may be another device or server within the printing system that provides estimates for print jobs so that printing devices may focus on printing operations. Resources at the printing devices are not tied up providing consumable use estimates by rendering documents.

The disclosed printing system may include a variable data printing (VDP) composition application. This application allows the operator to specify a form document onto which personalized content objects are added. The VDP tool will merge the personalized data with the form document to create a composed file that includes a personalized copy of the document for each record in the variable data. As part of the composition, the VDP application will add metadata to the document to indicate that content is reused. Metadata may be added by tagging images using image-specific metadata, such as information that is included in the image exchangeable image file format (EXIF) metadata. Content also may be tagged using generic metadata, such as information to be included in an object's piece info metadata. Content that is reused in all VDP records, such as on every $10^{th}$ page of a portable document format (PDF) file, also may be put in a separate PDF layer. The output of the composition is a standard PDF file A disclosed system includes an estimation system. When rendering pages for consumable use estimation, the estimation system will render all content that is not tagged as reused. Other content will not be rendered. The estimation system will calculate consumable use and use that as the initial consumable use for the page. The estimation system also will process content that is tagged as reused. If the content has not been rendered, then the estimation system will render the content in isolation. The estimation system will estimate consumable use to render the specific object and add this to the consumable use for the page. The consumable use for the specific object also is stored separately so it can be used in the next step. If the content has been rendered, then the estimation system will not render it again. Instead, the estimation system will add the saved consumable use for the object to the page's total consumable use.

Because variable content is usually a small number of reused images or text that are rendered quickly, the disclosed embodiments are able to greatly increase the speed used for consumable use estimation. Because reused objects are not blended with the static objects as they would be if the job was raster image processed normally, there will be some inaccuracies in the estimations. In most cases, however, these inaccuracies will be very small because most variable objects are placed over a white or solid color background. The benefit of increased performance should outweigh the inaccuracies in consumable use estimation.

The disclosed estimation system may be delivered as an offline application that will be much more performant versus typical offline consumable use estimation applications. It also may be delivered as an online application that will process consumable use estimation jobs much faster versus normal jobs. The term "online" application may refer to the application being implemented in the digital front end (DFE) of a printing device.

FIG. 1A depicts a printing system 100 for printing documents using printing device 104 according to the disclosed embodiments. Printing system 100 may be located in a print shop or other environment suitable for production printing operations. Printing system 100 includes one or more printing devices 104 that receive print jobs from one or more client terminals 102.

Printing device 104 receives print jobs through printing system 100, such as print job 103. After processing print job 103, printing device 104 prints or produces document 105 in a paper or media specified by the print job. Printing device 104 is disclosed in greater detail in FIG. 2. Printing device 104 also includes digital front end (DFE) 106, which facilitates processing print job 103. DFE 106 may be disclosed in greater detail in FIG. 1B. In addition to the components of DFE 106 disclosed in FIG. 1B, it also includes various settings that may be of use for ink use estimation. This information includes job settings 126, DFE configuration settings 128, and printing device configuration settings 130. DFE 106 also includes RIP firmware 290, disclosed in greater detail below.

Printing device 104 also includes consumables 132. Consumables 132 may relate to items at or within printing device 104 but are not actually part of the printing device itself. Consumables 132, however, are used in printing operations. Consumables 132 include ink 134 and toner 136. Ink 134 and toner 136 further may be broken into different colorant inks. For example, ink 134 may include cyan ink, magenta ink, yellow ink, and black ink. If printing device 104 is not capable of color printing, then ink 134 may include only black ink. Printing device 104 may include other consumables 132, such as sheets, that are not disclosed in detail herein.

Print job 103, when printed on printing device 104, uses an amount of consumables 132 to produce document 105. In some embodiments, print job 103 produces thousands or more of a document. Thus, the amount of consumables used for print job 103 may be considerable. As disclosed above, printing system 100 may need to provide an estimate for the use of consumable 132. The estimate determined for print job 103 may depend on various settings of printing device 104. The settings as well as print ticket settings 138 associated with print job 103 impact the amount of consumables 132 used to generate document 105.

For example, DFE 106 may use RIP firmware 290 to convert bitmap images, vector graphics, fonts, and the like associated with pages in print job 103 to bitmap/rasterized representations of the pages, such as C, M, Y, and K pixels. The sum of the values of pixels of a particular color in the rasterized pages can be proportional to the amount of consumables 132 used by printing device 104 to print that color. RIP firmware 290 may rasterize pages of print job 103 according to various image rasterization settings, as captured by DFE configuration settings 128. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Print engine 260 also is included with printing device 104. Printing device 104 may correspond to an industrial printing device capable of printing thousands of pages in an hour. Printing device 104 may be ink-based, toner-based, or both. Print engine 260 may include various parameters, shown as printing device configuration settings 130, that can control the operation of printing device 104, which impacts the amount of consumables 132 required by the printing device. For example, these settings may include printing device maintenance settings that control or effect head cleaning intervals, head clogging prevention intervals, and the like of printing device 104. Printing device configuration settings 130 also may include spitting, or printing spray pattern over all content, the printing of purge sheets, the printing of spit lines, or lines printed between page frames in a roll-fed printing device to ensure that all jets of the print head fire when instructed.

To lower printing device consumable usage, RIP firmware 290 may be configured via image rasterization parameters of DFE configuration settings 128 to reduce the density for each colorant, convert color images to black and white, and adjust tone reproduction curves (TRCs) to lower printing device use of consumables 132. Gray component replacement levels may be adjusted via DFE configuration settings 128.

The disclosed embodiments also include an estimation system 108 that includes estimation logic to facilitate performance of ink use estimation. Estimation system 108 may include estimation logic 118 having a DFE emulator 120 and a print engine emulator 122 configured to emulate operations performed by DFE 106 and print engine 260 of printing device 104. Print engine 260 is disclosed in greater detail below. DFE, emulator 120 and print engine emulator 122 may be configured with job settings 126, DFE configuration settings 128, and printing device configuration settings 130 to match settings associated with printing device 104. Estimation logic 118 also may be configured to estimate the amount of consumables 132 to process print job 103 and produce document 105.

In operation, estimation logic 118 may monitor information and settings of printing device 104 to determine any differences from previous estimates. This feature facilitates real-time configuration information for DFE 106, RIP firmware 290, or print engine 260 with the corresponding settings utilized by printing device 104.

Estimation system 108 may be any device within system 100 and connected to network 190 to receive and send data to printing device 104. Estimation system 108 also may be connected to other printing devices within system 100. Preferably, estimation system 108 is a server. It also may be another device, such as a computer. Estimation system 108 includes a memory 114 and a processor 112. Estimation system 108 also includes an input/output (I/O) subsystem 110 and a quote database 116.

Estimation system 108 also may refer to consumable estimation software that executes on a device. As disclosed below, "offline estimation device" may refer to this software. The term "offline" may refer to the fact that estimation system 108 is not part of printing device 104, or an "inline" component of the printing process.

Processor 112 is in communication with memory 114. Processor 112 is configured to execute instruction code in memory 114. The instruction code controls offline estimation device 108 to perform various operations for estimating consumables 132 that may be used by printing device 104. Processor 112 may be a computer processing unit that executes the instruction code in memory 114.

I/O subsystem 110 may include one or more input, output, or input/output interfaces that are configured to facilitate communications with other devices within system 100, such as client terminal 102 and printing device 104. An example of I/O subsystem 110 may be configured to dynamically determine the communication methodology utilized by entities of system 100 to communication information thereto. For example, I/O subsystem 110 may determine that a first entity utilizes a RESTful API and can, as a result, communicate with the entity using an interface that uses a RESTful communication methodology.

Estimation logic 118 is implemented within offline estimation device 108 to estimate the amount of consumables 132 to be used by printing device 104 for printing document 105 of print job 103. Estimation logic 118 includes DFE emulator 120 and print engine emulator 122, as disclosed above. DFE emulator 120 and print engine emulator 122 are configured with configuration setting information to match the settings and parameters of printing device 104.

DFE emulator 120 may be configured to emulate operations performed by DFE 106 of printing device 104. The emulation depends on various settings specified for printing device 104. For example, DFE emulator 120 may be configured to convert bitmap images, vector graphics, fonts, and the like specified in sample pages of print job 103 to bitmap/rasterized representations of the pages using C, M, Y, and K pixels. The manner in which DFE emulator 120 performs the conversion may depend on various image rasterization settings of the DFE emulator, which correspond to the image rasterization settings of DFE 106.

In some embodiments, DFE emulator 120 retrieves a RIP of the plurality of RIPs 124 available at estimation system 108. Selection of the appropriate RIP provides a better basis to estimate ink use. For example, estimation logic 118 may determine the DFE, software version for DI-E, 106 to select a RIP that has the same version. Estimation system 108 includes many different RIPs 124. Preferably, it includes one for each software version that has been released. DFE emulator 120 may automatically configure the selected RIP using configuration settings from information retrieved from DFE 106.

Print engine emulator 122 may be configured to emulate operations performed by print engine 260 or printing device 104. The emulation may depend on various printing device configuration settings 130 for printing device 104.

Estimates provided using estimation logic 118 of estimation system 108 may be stored as a record or entry in quote database 116. Each entry to quote database 116 may specify aspects associated with an estimate provided to a customer for processing a particular print job 103. Each entry may include field for job settings 126, DFE configuration settings 128, and printing device configuration settings 130 used to provide the estimate as well as a consumables estimate field and a cost field. Other information may be provided such as a client information field, a job information field, or a unique identification (ID) field. Preferably, print job 103 is a recurring printing operation in that multiple instances will occur that involves the printing of document 105.

Figure 1B:
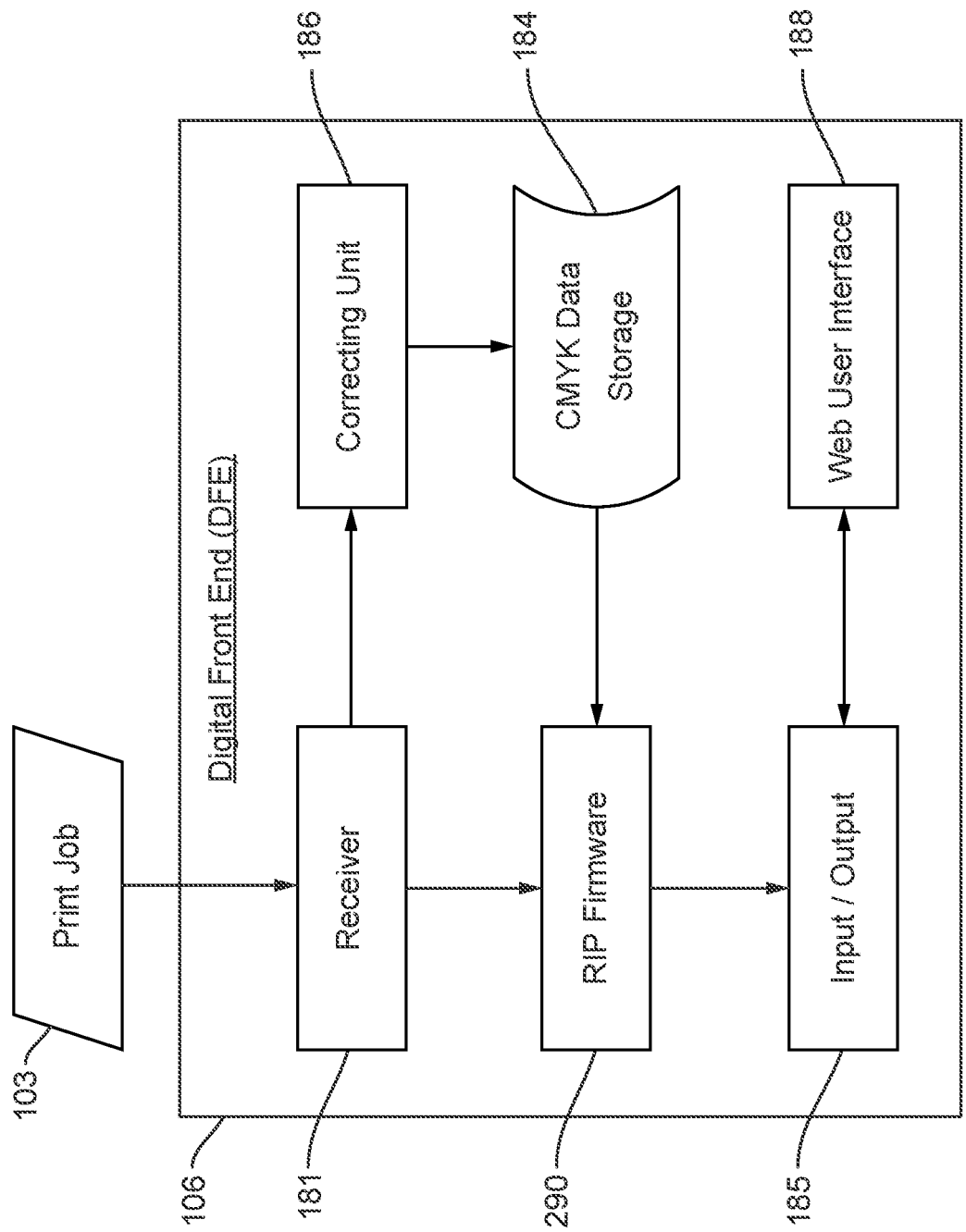
FIG. 1B illustrates a digital front end (DFE) for a printing device according to the disclosed embodiments.

FIG. 1B depicts a block diagram of DFE 106 according to the disclosed embodiments. DFE 106 includes a receiver 181, an RIP firmware 290, a CMYK data storage 184, an input/output connector 185, and a correcting unit 186. RIP firmware 290 also is disclosed in FIG. 2 and in greater detail in FIG. 3. Additional components within DFE 106 may be implemented, including those disclosed in FIG. 1A. DFE 106, therefore, includes data for job settings 126, DFE configuration settings 128, and, optionally, printing device configuration settings 130, even though these are not shown in FIG. 1B.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with other printing devices or estimation system 108, if it is located at a separate device, using, for example, input/output connector 185. Web user interface 188, or web application, allows a user of the DFEs of other printing devices to interact with content or software running on DFE 106.

Figure 2:
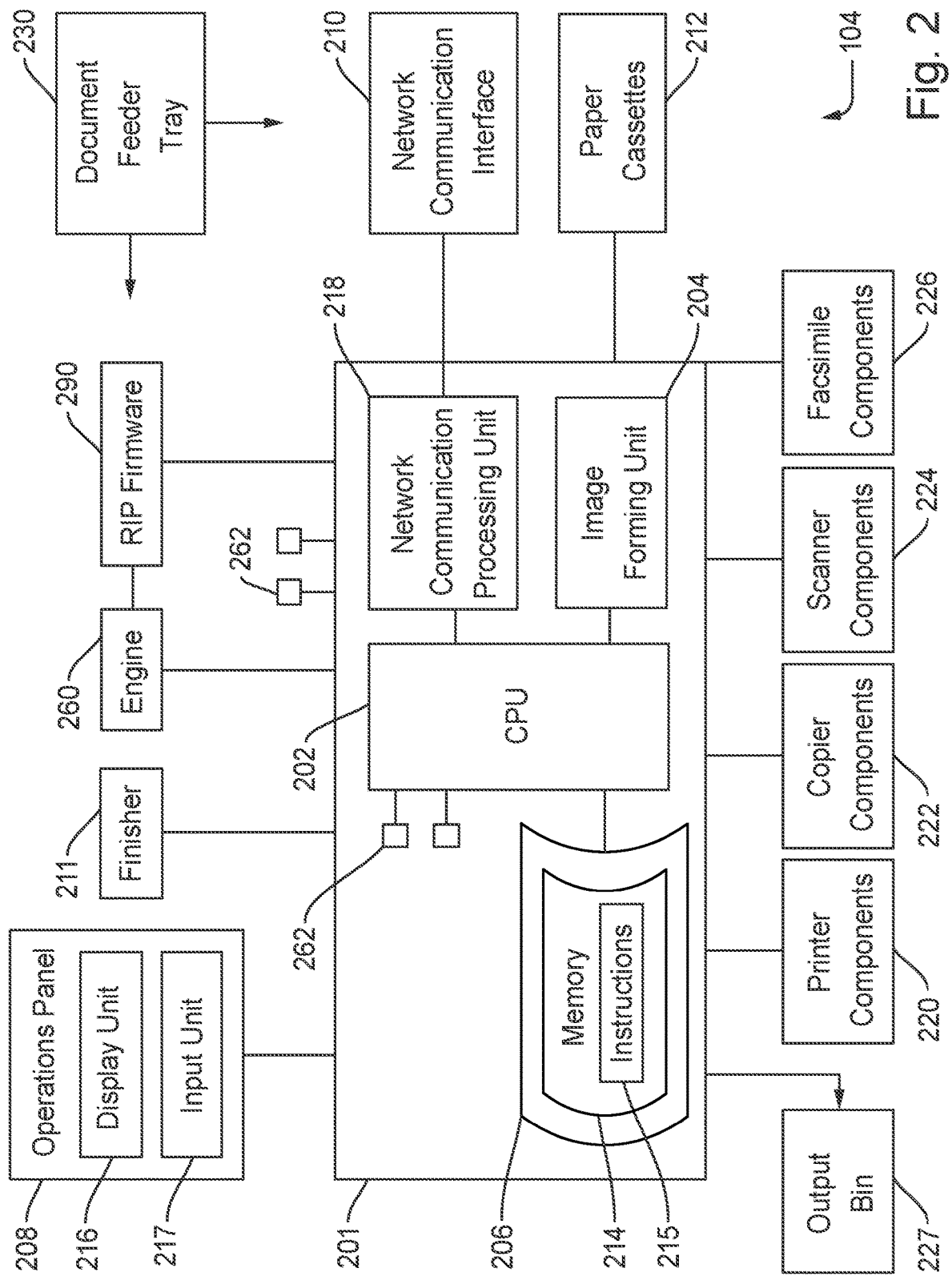
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from estimation system 108, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from offline estimation device 108, if applicable. Estimation system 108 may send ink use estimation data to printing device 104 for display. For example, the operator at printing device 104 may request an estimate for a received print job 103. Printing device 104 requests an estimate for consumables 132 according to the disclosed embodiments.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from estimation system 108 as well as other printing devices within system 100.

Figure 3:
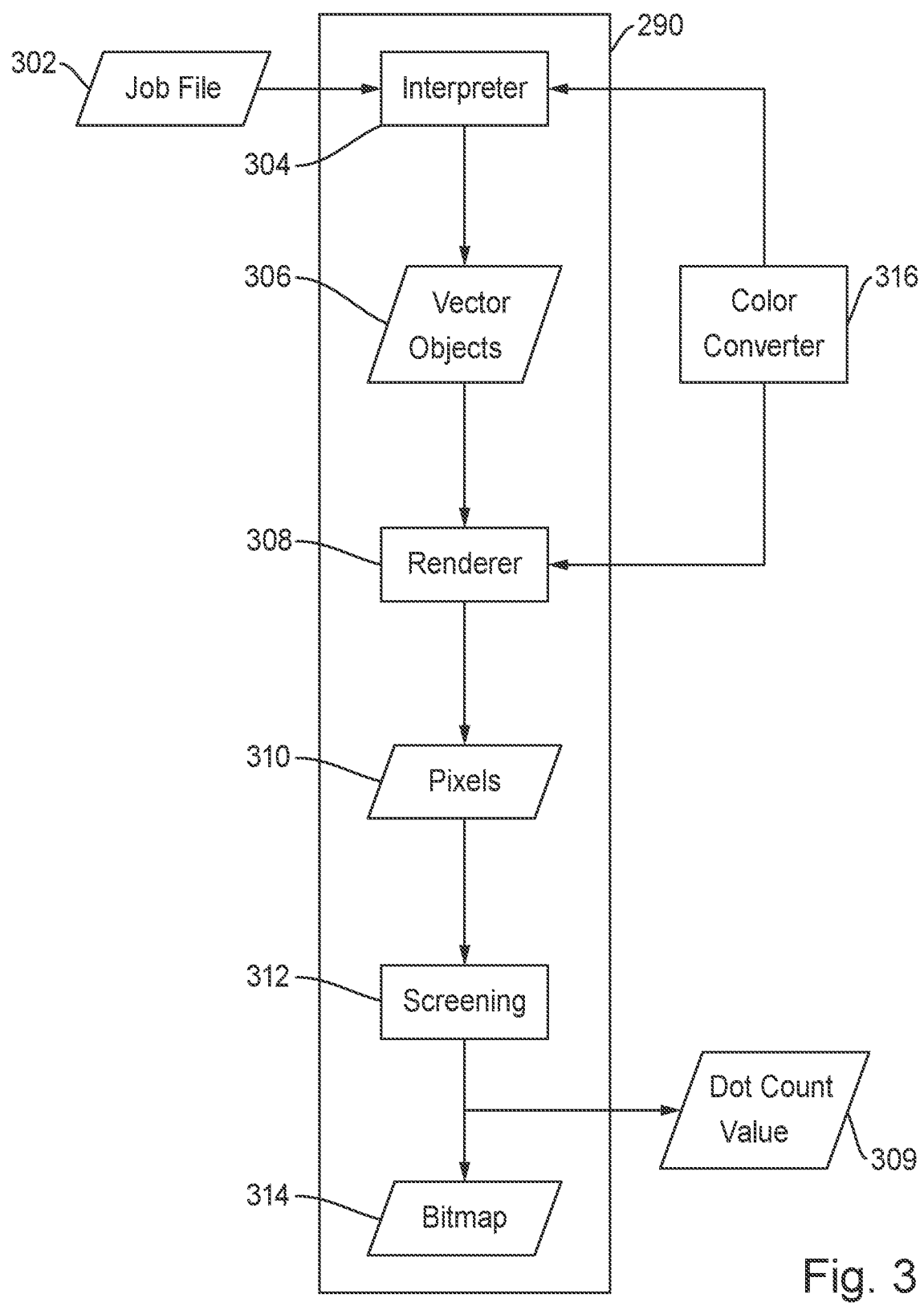
FIG. 3 illustrates a block diagram of RIP firmware used within the DFE according to the disclosed embodiments.

FIG. 3 depicts a block diagram of RIP firmware 290 used within DFE 106 according to the disclosed embodiments. RIP firmware 290 converts text and image data from different file formats including PDF, TIFF, or JPEG into a format that printing device 104 can understand. The process of raster image processing a page implements several steps to be performed, regardless whether the page is submitted as PostScript, PDF, or any other page description language (PDL). In short, RIP firmware 290 may provide interpretation, rasterization, and screening.

Job file 302 may be a job file associated with print job 103. Job file 302 may be a PostScript file in code. Job file 302 may be provided to RIP firmware 290 in DFE 106 to convert its code into raster or bitmap code. Job file 302 is received at interpreter 304, which interprets the commands in the code to redraw the object and elements of a page as vector objects 306. The PDL of job file 302 is read and decoded into graphical elements to be placed on a sheet. Each element may be an image, a character of text, a fill, stroke, and the like or listed in vector objects 306.

Renderer 308 processes vector objects 306 to convert every graphical element into the appropriate pattern of pixels to form the output raster. The resolution independent vector objects are converted into pixels 310. Screening 312 takes the raster image of pixels 310 to form individually screened cyan, magenta, yellow, and black separations. These are halftone dots in the form of a bitmap 314 consisting of commands that can be understood by print engine 260.

RIP firmware 290 also may implement color converter 316. Color converter 316 may implement the functions disclosed above with regard to color conversion. Color converter 316 provides color management and calibration. These actions may be applied during interpretation or rendering, depending on configuration and job content. Color printing resources may be accessed to provide the color management.

RIP firmware 290 may have a software version or other identification associated with it that distinguishes this version from others in system 100. Printing device 104 may implement several different RIP firmware versions depending on the type of print job 103. Further, different printing devices may implement different versions of the RIP firmware. Preferably, RIP firmware 290 is software implemented.

The disclosed embodiments also may determine dot count value 309 from the rendered image provided by renderer 308. Dot count values may be adjusted based on screening 312 and based on settings at printing device 104. Dot count value 309 may be reported to estimation system 108, as disclosed below.

The rendered document, or bitmap 314, may be sent to print engine 260. Estimation system 108 may apply a formula to dot count value 309 along with applicable settings to determine consumable use. Further, the disclosed embodiments may use this information to use a single consumable use estimate with a variety of job settings 126, DFE configuration settings 128, or printing device configuration settings 130. Dot count value 309 should not change once determined from the rendered document from RIP firmware 290. Engine specific settings, such as halftones, however, will impact consumable use at print engine 260, and may differ over time at printing device 104 or at another printing device within system 100.

Figure 4:
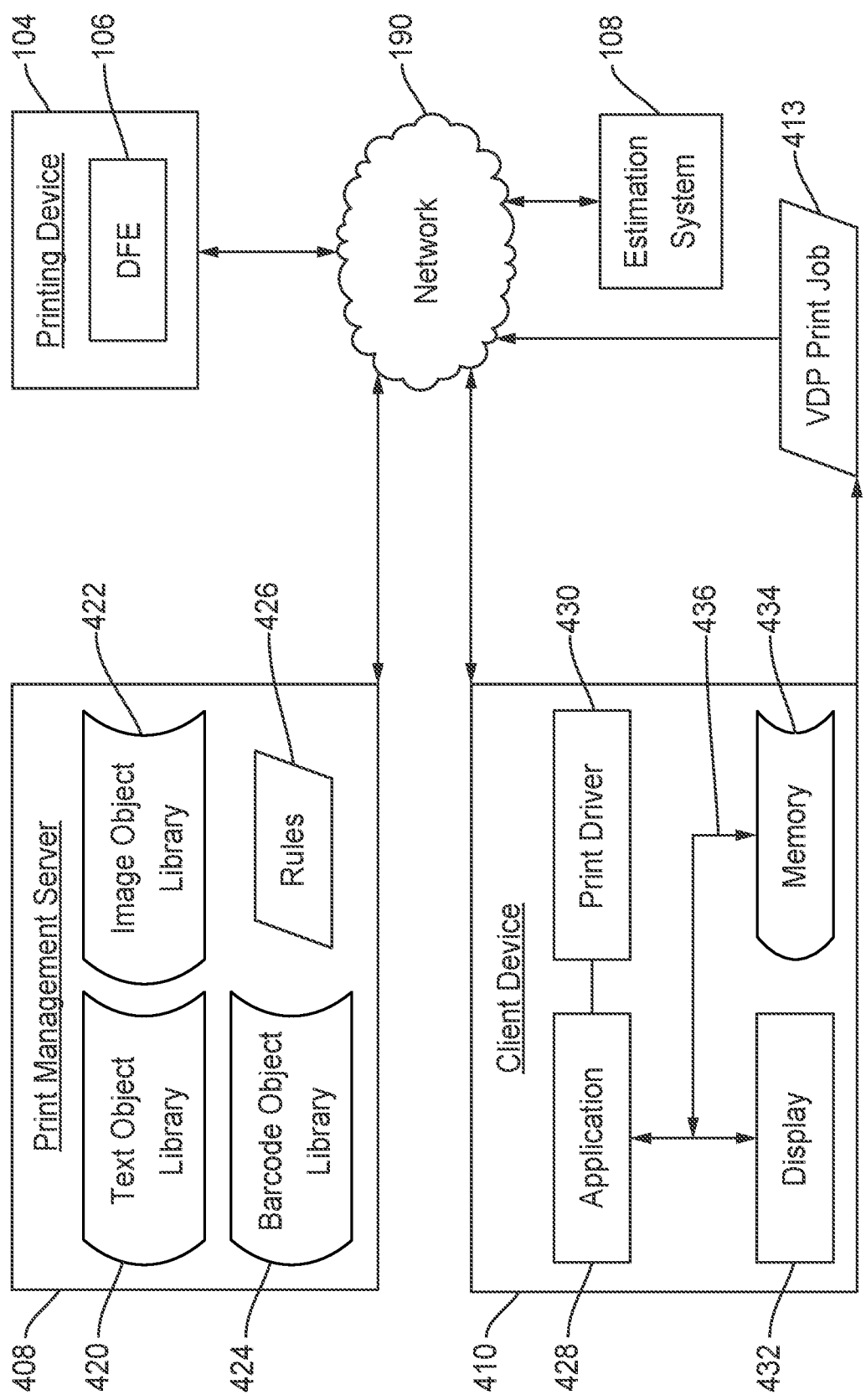
FIG. 4 illustrates a printing system for variable data printing operations according to the disclosed embodiments.

FIG. 4 depicts a printing system 400 for variable data printing operations according to the disclosed embodiments. Printing system 400 may be located in a print shop or other environment suitable for production printing operations. Printing system 400 may be implemented with printing system 100, and includes one or more printing devices 104 that receive print jobs from one or more client devices 410. Further, printing operations may be managed by print management server 408. As shown in FIG. 4, VDP print job 413 is submitted from client device 410 to printing device 104, but it also may be submitted to print management server 408 which selects printing device 104 to complete the job.

Client device 410 may be capable of executing applications and programs 428 to generate documents and files, such as, for example, a computer, a laptop computer, mobile device or tablet, smart phone, kiosk, and the like. Client device 410 may send print jobs to printing device 104 over network 190 implemented within printing system 400 using print driver 430. Print driver 430 converts the data generated or created by application 428 into a format that printing device 104 can understand. The result is VDP print job 413. Additional client devices may be connected to printing device 104, which submit print jobs to printing device 104 or print management server 408.

Variable designer application 428 may be an application that enables VDP printing operations. Application 428 may differ from a conventional desktop publishing application in that it implements a variable area on documents. The variable areas, or objects, include setting of unique information so that contents to be displayed can be changed according to information provided in data records as well as from libraries or a database. The unique information can be expressed by a conditional relationship representing a relationship between a variable, or attribute, of each area and data provided to application 428.

A user may execute application 428 to generate VDP print job 413, as disclosed in greater detail below. A preview of a set of documents corresponding to VDP print job 413 may be displayed at client device 410 in display 432. Memory 434 may store VDP print job 413 as well as various objects and data used to generate the print job. The components within client device 410 may be connected by bus 436 to receive and transmit data and signals.

Print management server 408 may interact with printing device 104 and client device 410 to perform variable data printing operations. In some embodiments, VDP print job 413 is submitted to print management server 408, which then forwards the print job to printing device 104. Print management server 408 may include libraries and other data storage components to enable application 428 to generate VDP print job 413.

For example, print management server 408 may include text object library 420 that stores text variables, data for filling a text object within one or more documents in VDP print job 413, Unicode blocks, and other information to be used in filling the text object. It also includes image object library 422 that includes image variables to be used within one or image objects within the documents. The image variables may include a unique image file that may be retrieved using a URL. Print management server 408 also includes barcode object library 424 that includes barcode variables to be used within one or more barcode objects within the documents. The barcode variables may include a unique barcode file that may be retrieved using a URL. Server 408 also includes rules 426 that define what information may be displayed or printed within one or more of the objects embedded in the documents of VDP print job 413.

In some embodiments, print management server 408 is not within printing system 400. In such a case, the functions and features of print management server 408 are provided at client device 410 in conjunction with application 428 or implemented at printing device 104 using DFE 106. For example, libraries 420, 422, and 424 as well as rules 426 may be implemented at client device 410.

Printing system 400 also includes estimation system 108 for estimating consumable use for VDP print job 413, much like it does for print job 103. Estimation system 108, in some embodiments, may be implemented on print management server 408. In other embodiments, estimation system 108 may be implemented as an application on client device 410 or at printing device 104.

Figure 5:
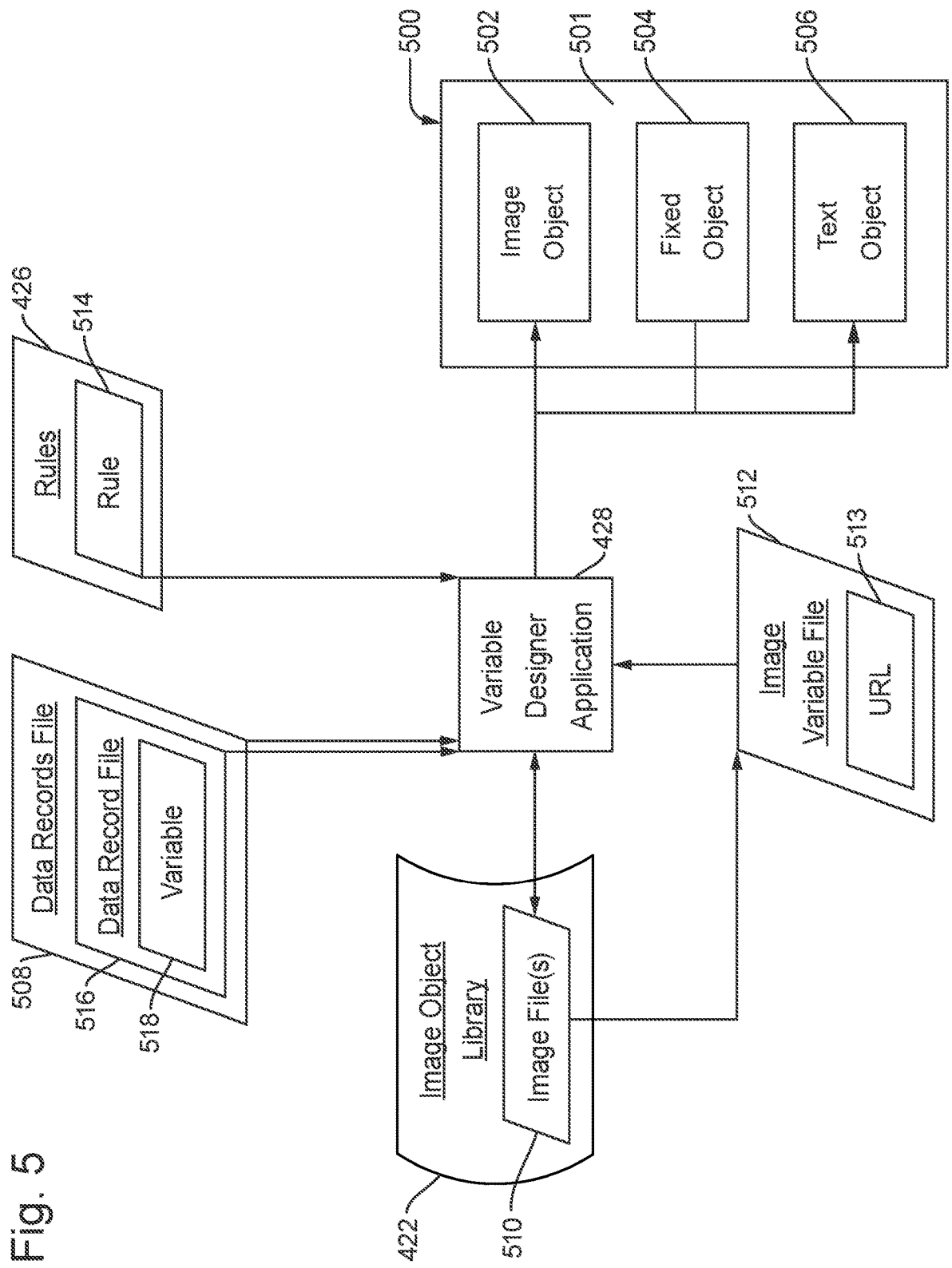
FIG. 5 illustrates an example document having an image object for use with variable data printing operations according to the disclosed embodiments.

FIG. 5 depicts an example document 500 having an image object 502 for use with variable data printing operations according to the disclosed embodiments. Document 500 may be a document for use in variable printing operations, such as a postcard, flyer, brochure, and the like. Document 500 may include a document template 501 that defines positions of image object 502, fixed object 504, and text object 506 within the document. Preferably, a large plurality of different versions of document 500 are generated where image object 502 and text object 506 may be variable and fixed object 504 is not. Different versions of document 500 may be created and generated based on the variable objects.

Image object 502 may be filled with one of a plurality of image files 510. For example, image files 510 include image files such as image file 1, image file 2, image file 3, and image file 4. As shown, variable designer application 428 may select one of the plurality of image files 510 to insert into image object 502. The selected image may be shown as image variable file 512. Image files 510 may be imported or obtained from image object library 422. Variable designer application 428 may not need every image within image object library 422, so that the user or selection process may select image files to place into document template 501. For example, image file 1, image file 2, image file 3, and image file 4 may be used to fill out document template 501 to generate document 500.

Document template 501 for document 500 may include fixed object 504. Fixed object 504 may be a fixed image used in every document 500 printed. Fixed object 504 also may be an image or text that provides information to the recipient of document 500, such as name of the sender, an address for the sender, a picture of a product, and the like.

Image variable file 512 may be selected from one of the plurality of image files 510. Which image is selected may be based on a variable 518 from a data record file 516 being used for this specific document. This feature is disclosed in greater detail below. Image variable file 512 also may be selected according to a defined rule 514 of rules 426. Image variable file 512 may include URL 513 that directs application 428 to a location of the associated image file to be placed in document 500.

Variable designer application 428 also may import data records file 508 having content to fill out other objects within document 500, such as text object 506. Data records file 508 preferably also includes locations of the images that are added to the documents of VDP print job 413. These images, barcodes, and text, as disclosed below, may be variable content. For example, data records file 508 may be names and addresses of potential customer list stored on client device 410 or print management server 408. Data record file 516 for each data file is provided to variable designer application 428 to generate document 500 using document template 501. As disclosed above, data record file 516 may include variable 518. For example, if variable 518 is "2," then image file 2 is selected to be placed in image object 502.

Image variable file 512 also may be selected according to a rule 514. Rule 514 may specify one or more conditions that need to be met in order to use a particular image file. When creating document template 501, the disclosed embodiments may define a rule stating that the selected image file for image object 502 correspond to an age of the person associated with record file 516. Thus, variable 518 is the person's age. Based on rule 514, one of plurality of image files 510 is provided. For example, if variable 518 is 33 (the addressee is 33 years old) and rule 514 specifies that image file 4 is applicable for addressees between the ages of 25-40, then image file 4 is provided as image variable file 512 to fill image object 502.

Using these features, the disclosed embodiments may select specific documents generated according to data records file 508, plurality of image files 510, and rule 514. The disclosed embodiments are interested in the different results from the application of these items by variable designer application 428. A document record will be added for each unique image file of plurality of image files 510. Thus, a document 500 will be generated and added to the preview set of records having image files 510, such as image file 1, image file 2, image file 3, and image file 4, as applicable.

Further, for each rule 514, a document 500 generated for each outcome of the rule will be added. In other words, a record of a document will be added for each condition of the rule. Further, if there are unique image files used, such as for fixed object 504, then a document having each unique image file should be added. Uniqueness may be based on the different URLs used to retrieve image files from image object library 422. Uniqueness should be evaluated using the complete image URL.

Figure 6:
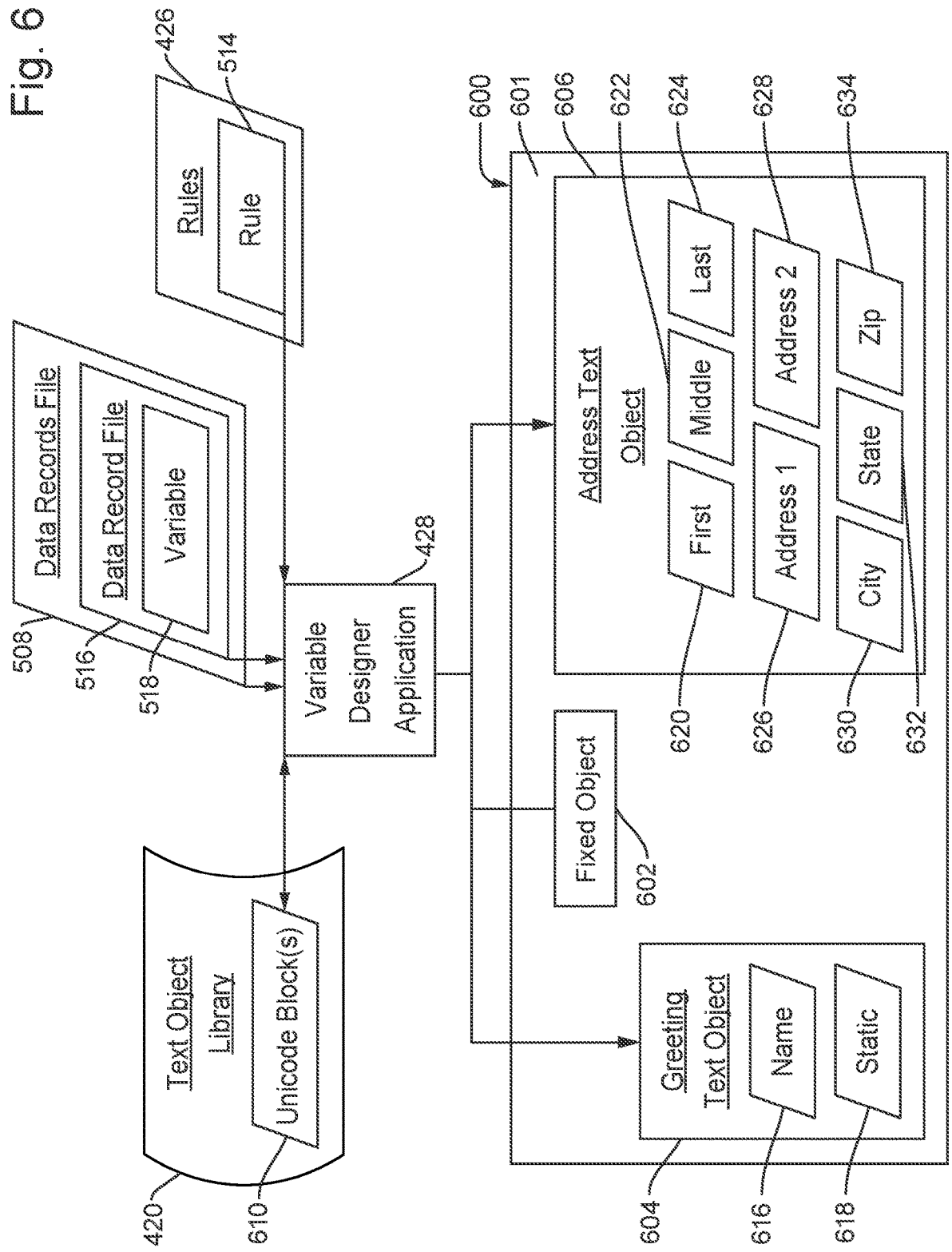
FIG. 6 illustrates a document having text objects for use within variable data printing operations according to the disclosed embodiments.

FIG. 6 illustrates a document 600 having text objects 604 and 606 for use within variable data printing operations according to the disclosed embodiments. Document 600 may be a document for use in variable printing operations, such as a postcard, flyer, brochure, and the like. Document 600 may include a document template 601 that defines positions of fixed object 602 and text objects 604 and 606 within the document. Preferably, a large plurality of different versions of document 600 are generated where one or more text variables without text objects 604 and 606 are variable and fixed object 602 is static. Different versions of document 600 may be created and generated based on the variable objects.

As disclosed above, variable designer application 428 may process data, information, criteria, and rules to fill the objects within each document 600 according to document template 601. For document 600, variable designer application 428 may fill text objects 604 and 606 with different text variable data, such as names or address data. Text object 604 may be referred to as greeting text object 604, as it includes a greeting or suggestion. Text object 606 may be referred to address text object 606, as it includes text variables related to names and addresses within data records file 508. For text objects having text variables, there may be more than one variable as disclosed below. Fixed object 602 may be text, an image, a barcode, or the like, that is included in every document 600.

Greeting text object 604 includes text variable 616 and static text 618. Text variable 616 may be referred to as name text variable 616. Variable designer application 428 may fill name text variable 616 with the name information provided in data record file 516 by one or more variables 518. Static text 618 may be text that is placed in every document 600 and provided with document template 601. Alternatively, it may be provided by text object library 420 if the user selects a pre-made format available to variable designer application 428. The size of the data within greeting text object 604 may vary as the names are different lengths. There may be a document with the longest record for name text variable 616 and a document with the shortest record for name text variable 616.

Address text object 606 may include several text variables, each having different data that is placed within the text object according to document template 601. For example, address text object 606 may include first name text variable 620, middle initial text variable 622, last name text variable 624, address 1 text variable 626, address 2 text variable 628, city text variable 630, state text variable 632, and zip code text variable 634. The data for these data variables may be provided by a plurality of variables 518 of data record file 516. Each text variable may include a longest record and a shortest record as the data for each variable differs in length or size. Further, some text variables may not have any data, such as middle initial text variable 622 or address 2 text variable 628.

Some text variables or static text may come from Unicode blocks instead of standard Basic Latin text. For example, symbols such as μ, Δ, Σ, ≠, ™, β, and the like may be used for "text" within document 600. The symbols differ between different Unicode blocks. For example, some text may be from the Greek and Coptic Unicode block and other text from the Cyrillic Unicode block. Thus, Unicode blocks 610 may be provided. Unicode blocks 610 may include Unicode block 1 and Unicode block 2 that include separate groups of special text, or symbols, used to generate documents 600. When previews are generated, variable designer application 428 may access Unicode blocks 610 so that illegible data is not shown in the preview. The appropriate text or symbol from the identified Unicode block is shown. Unicode blocks 610 for use with the disclosed embodiments may be stored at text object library 420 or a word processing application used to generate VDP print job 413.

Placement of text variables also may be subject to a rule 514 of rules 426 defined for the print job of documents 600. Rule 514 for text variables may state that if no middle initial text variable 622 is used, then first name text variable 620 and last name text variable 624 are placed next to each other, or, in other words, middle initial text variable 622 is removed. Another rule may define that if there is no data for address 2 text variable 628, then city text variable 630 and state text variable 632 are placed directly underneath address 1 text variable 626, or, in other words, address 2 text variable is removed within address text object 606.

Figure 7:
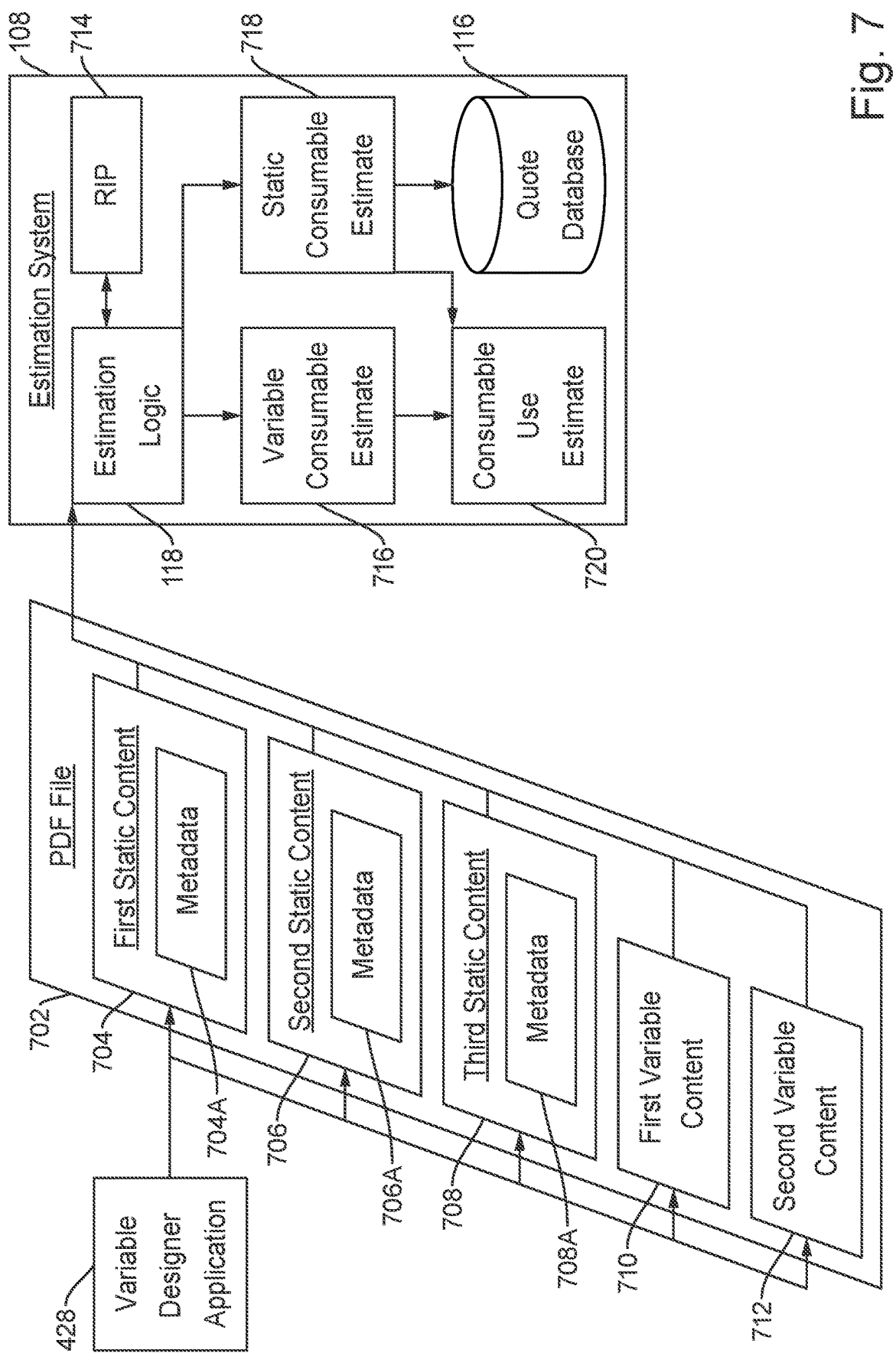
FIG. 7 illustrates a block diagram of a variable designer application in conjunction with an estimation system according to the disclosed embodiments.

FIG. 7 depicts a block diagram of variable designer application 428 in conjunction with estimation system 108 according to the disclosed embodiments. FIG. 7 shows variable designer application 428 working with estimation system 108 to provide a consumable use estimation for VDP print job 413. Variable designer application 428 and estimation system 108 may be located on separate devices within system 400. Alternatively, they may be supported on the same device.

Variable designer application 428 operates as disclosed above. Variable designer application 428 allows the operator or customer to form a document, such as document 500, onto which personalized content objects are added. Referring to FIG. 5, document 500 may include image object 502, fixed object 504, and text object 506. Variable designer application 428 may act as a tool to merge the personalized data with document template 501 to create a composed file that contains a personalized copy of the document for each record in data records file 508.

As part of the composition, variable designer application 428 adds metadata to the document to indicate that content is reused. For example, variable designer application 428 generates PDF file 702. PDF file 702 may be based on a document template, such as document template 501 that refers to and positions objects within the document. These objects are filled with content, either static or variable. Static content may correspond to fixed objects disclosed above and is reused during the variable printing operations. Variable content may correspond to the variable objects disclosed above.

For example, referring to FIG. 6, static content may refer to fixed object 602 and static text 618 in document 600. Variable designer application 428 reuses this content in generating the different PDF files for printing during the variable printing operations. Variable content may refer to the other objects within document 600, such as text variable 616 for a name and the objects in address text object 606. The disclosed embodiments want to tag the static content in document 600 that is reused over and over in the variable printing operations.

Referring back to FIG. 7, PDF file 702 includes first static content 704, second static content 706, third static content 708, first variable content 710, and second variable content 712. Variable designer application 428 tags first static content 704 with metadata 704A, second static content 706 with metadata 706A, and third static content 708 with metadata 708A. Additional instances of static or variable content may be configured in PDF file 702.

Static contents 704, 706, and 708 may be images, text, barcodes, graphics, and the like. Metadata 704A, 706A, and 708A are tagged to each, respectively. Images may be tagged using image-specific metadata. Information may be included in the image's EXIF metadata. Content also may be tagged using generic metadata. Content that is reused in all VDP records, such as on every $10^{th}$ page of PDF file 702, also may be put in a separate PDF layer. In contrast, first variable content 710 and second variable content 712 are not tagged with metadata. PDF file 702 contains metadata that an RIP can use to improve rendering for consumable use estimation.

PDF file 702 is provided to estimation system 108 for generating consumable use estimate 720. For proper consumable use estimation, estimation system 108 may render pages within PDF file 702. Estimation system 108 may treat the rendered data differently depending on how it is treated within PDF file 702. Estimation system 108 may select a RIP 714 from plurality of RIPs 124 to provide the raster image processing to render the pages. RIP 714 may be selected to best match a RIP within DFE 106 for printing device 104. Estimation system 108 also uses estimation logic 118 to generate estimates of the content within PDF file 702. Estimation logic 118 is disclosed above.

Estimation system 108 renders all content that is not tagged as reused. For PDF file 702, this content includes first variable content 710 and second variable content 712. Other content will not be rendered at this time. Estimation system 108 calculates consumable use and uses this as the initial consumable use for the page. Thus, estimation system 108 calculates variable consumable estimate 716 based on the rendered variable content that is not tagged for PDF file 702. Estimation system 108 will estimate consumable use from variable consumable estimate 716, which is generated from first variable content 710 and second variable content 712.

Estimation system 108 processes content that is tagged as reused. This content may include first static content 704 as tagged by metadata 704A, second static content 706 as tagged by metadata 706A, and third static content 708 as tagged by metadata 708A. If the content has been rendered, estimation application 108 will render the content in isolation using RIP 714. Estimation system 108 will estimate consumable use to render the specific content identified by the metadata. Thus, static consumable estimate 718 is generated from rendered content from first static content 704, second static content 706, and third static content 708. Static consumable estimate 718 is merged with variable consumable estimate 716 to generate consumable use estimate 720. In some embodiments, static consumable estimate 718 may be saved in database 116 for use with later estimates that use the static content identified in PDF file 702.

In some embodiments, first variable content 710 and second variable content 712 also may be tagged with metadata. Variable content may be reused by variable designer application 428. For example, the variable content may be 10 different images used to personalize content amongst 1000s of different documents. The images are reused over and over again, but just not in every document, such as static content. Each record will use variable content, or a variable image, but it will be one of these 10 images. Because the images are reused, they also may be tagged, rendered, and stored like static content disclosed above. Estimation system 108 may retrieve the variable content stored therein as it is reused in subsequent documents. One difference between tagged variable content and tagged static content is that the static content may be reused in every record, whereas the reused variable content is used in a subset of records, depending on the variable data and any applicable rules.

Figure 8:
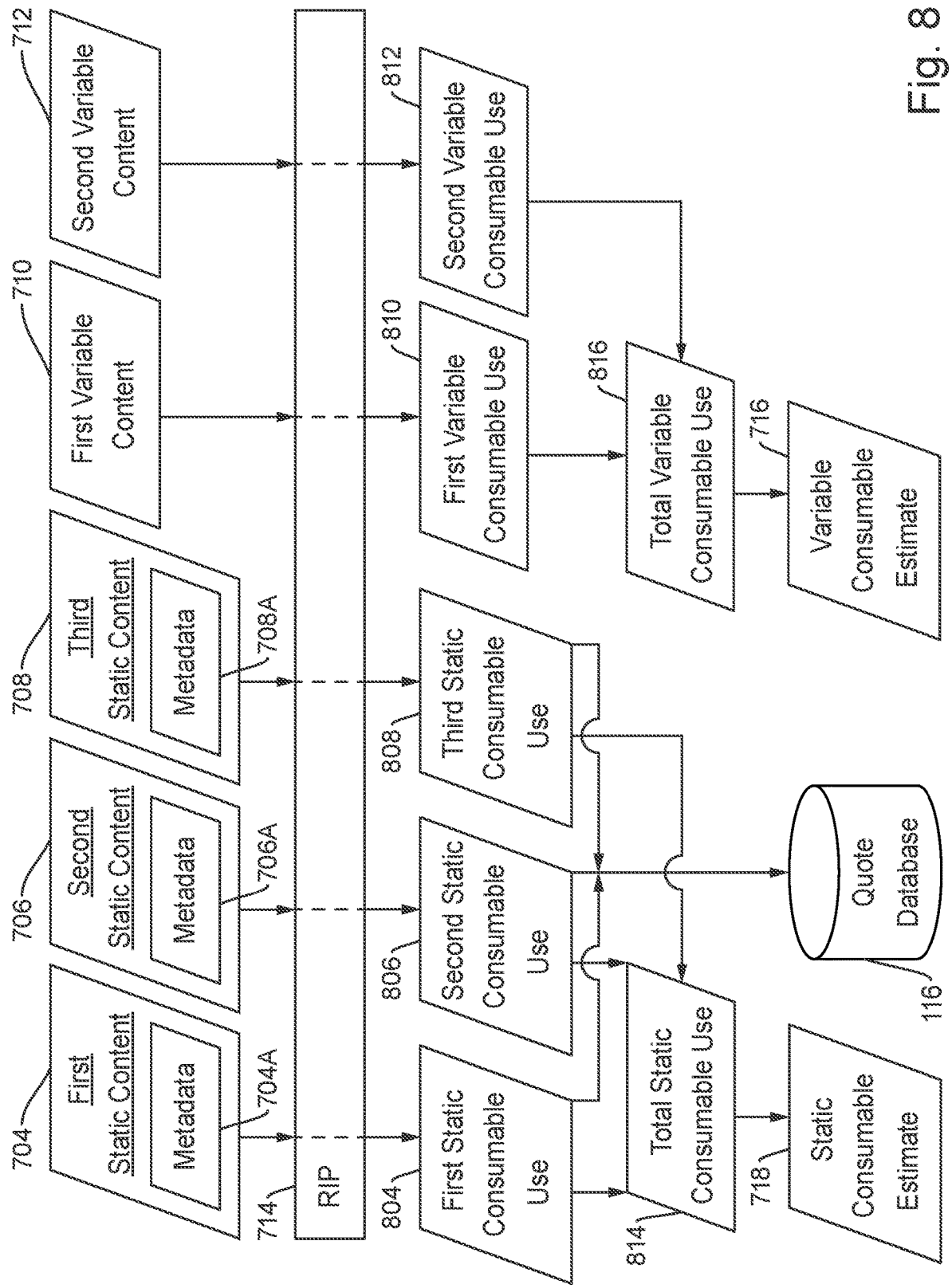
FIG. 8 illustrates a block diagram of consumable use estimation within the estimation system according to the disclosed embodiments.

FIG. 8 depicts a block diagram of consumable use estimation within estimation system 108 according to the disclosed embodiments. FIG. 8 shows the process for handling static and variable content in a document in greater detail. In some embodiments, a static consumable estimate 718 may be generated for each object having static content. For example, a static consumable estimate 718 may be generated for first static content 704 that is separate from a static consumable estimate 718 for second static content 706. The consumable use to render these objects separately then may be stored separately in order to provide greater flexibility using estimation system 108.

As disclosed above, all content from PDF file 702 may be rendered that has not been rendered yet by estimation system 108. First static content 704 is tagged as reused content by metadata 704A. RIP 714 within estimation system 108 renders first static content 704 to generate a first static consumable use 804. As disclosed above, a dot count value 309 may be determined for first static content 704. This dot count value 309 may be used to determine first static consumable use 804. First static consumable use 804 then may be provided to total static consumable use 814. Thus, a separate consumable use value is determined for first static content 704.

The above process may be repeated for the other objects within PDF file 702. Second static content 706 is tagged by metadata 706A. Using RIP 714, second static consumable use 806 is determined for second static content 706, which is then added to total static consumable use 814. Third static content 708 is tagged by metadata 708A. Using RIP 714, third static consumable use 808 is determined for third static content 708, which is then added to total static consumable use 814. After all static content is rendered, total static consumable use 814 may be provided to estimation logic 118 to generate static consumable estimate 718.

First static consumable use 804, second static consumable use 806, and third static consumable use 808 also are stored separately within database 116 for use in later processing of VDP print job 413. Thus, if the content has been rendered, then estimation system 108 will not render it again. Instead, estimation system 108 will add saved first static consumable use 804 for the object of first static content 704 to be used in subsequent pages that include the object. The same process is repeated for the objects of second static content 706 and third static content 708. Estimation system 108 does not have to render these objects over and over to determine total static consumable use.

With regard to variable content, these items have not been tagged with metadata such that they always will be rendered. Thus, first variable content 710 is rendered by RIP 714 to generate first variable consumable use 810. Second variable content 712 is rendered by RIP 714 to generate second variable consumable use 812. These values are combined to generate total variable consumable use 816. The total amount of consumable use to render the variable content for VDP printing operations for PDF file 702 is determined. This amount is used by estimation logic 118 to determine variable consumable estimate 716 for PDF file 702.

The disclosed embodiment also may account for page consumable use estimates that do not have all of the content available for the variable printing operations. For example, the next PDF file 702 may only include first static content 704 and third static content 708. Second static content 706 may be a graphic not included in the current instance of PDF file 702. This feature may be especially important where variable designer application 428 assigns the graphic to some documents but not others. Estimation system 108 does not want to include second static consumable use 806 to total static consumable use 814. This value for second static content 706 is not retrieved when determining the consumable use estimate for this PDF file 702.

The different pages may be compiled to determine an overall consumable use estimate for VDP print job 413. Some pages may have a total static consumable use 814 having the static consumable uses applicable for all the static content used by VDP print job 413. Other pages may have a total consumable use 814 having a subset of the static content used therein. Total variable consumable use 816 also will have different values based on the different dot counts generated after rendering the variable content. The disclosed embodiments may account for all the variations within PDF files 702 printed in the variable printing operations.

Because variable content usually is a small number of reused images or text that render quickly, the disclosed embodiments are able to increase the speed used for consumable use estimation, or implement accelerated consumable use estimation. Reused objects are not blended with the variable objects as they would be if PDF file 702 was raster image processed normally. As a result, some inaccuracies may be present in the estimates, or determining the total consumable use. In most cases, however, these inaccuracies will be small because most variable objects are placed over white or solid color backgrounds. The benefits of increased performance should outweigh any inaccuracies in consumable use estimation, which includes inherent inaccuracies.

Figure 9:
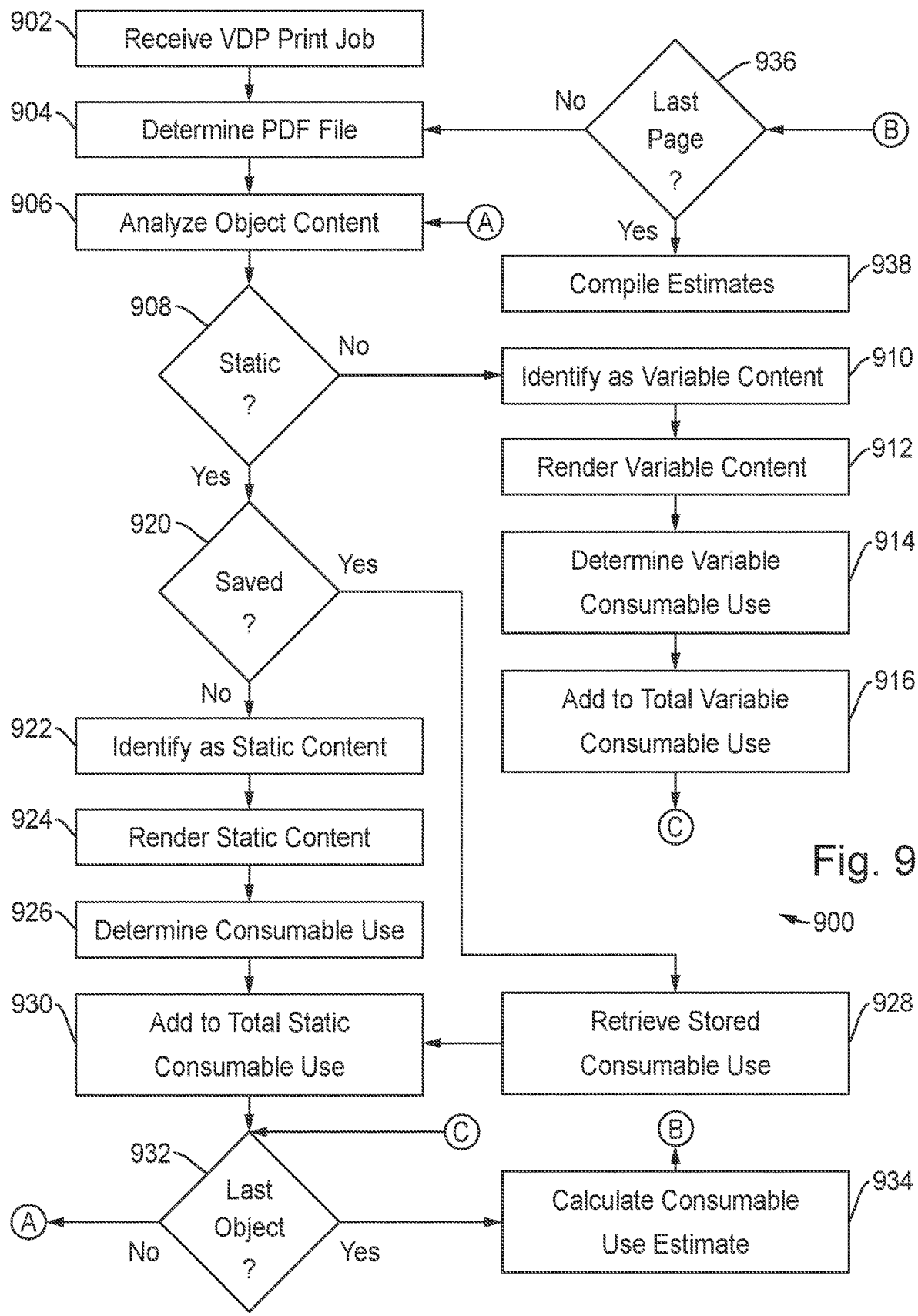
FIG. 9 illustrates a flowchart for accelerated consumable use estimation according to the disclosed embodiments.

FIG. 9 depicts a flowchart 900 for accelerated consumable use estimation according to the disclosed embodiments. Flowchart 900 may refer to FIGS. 1A to 8 for illustrative purposes. Flowchart 900, however, is not limited to the disclosure of the embodiments shown by FIGS. 1A to 8.

Step 902 executes by receiving VDP print job 413 at estimation system 108. VDP print job 413 may be generated using variable designer application 428, as disclosed above. Preferably, VDP print job 413 includes recurring pages that use variable content along with fixed, or static, content. These recurring pages may be shown as PDF files 702. VDP print job 413 originally may be received at printing device 104 then forwarded to estimation system 108 for pricing estimates to complete the print job. Part of the pricing estimates include a consumable use estimate.

Step 904 executes by determining PDF file 702 within VDP print job 413. PDF file 702 may be a page or item within VDP print job 413. For example, VDP print job 413 may include may different PDF files with variable and static content. Estimation system 108 identifies PDF file 702 from the plurality of PDF files within VDP print job 413, as they were created by variable designer application 428.

Step 906 executes by analyzing object or content within PDF file 702. PDF file 702 is analyzed to determine one or more objects or content that is to be printed. Referring to FIG. 7, PDF file 702 includes first static content 704, second static content 706, third static content 708, first variable content 710, and second variable content 712. The disclosed embodiments analyze each instance of content in turn. For example, the disclosed embodiments may analyze first static content 704.

Step 908 executes by determining whether the content is static content. Estimation system 108 determines whether metadata is tagged to the content to identify it as being reused in printing VDP documents. For example, first static content 704 is tagged with metadata 704A. Thus, first static content 704 is determined to be static content.

If step 908 is no, then step 910 executes by identifying that the content is variable content. No metadata is tagged to the content. Therefore, the content will not be reused. In some embodiments, the variable content will be reused but not for every document. For example, the content analyzed by step 906 may be first variable content 710. It does not include a tag of metadata. Step 912 executes by rendering the variable content. Thus, first variable content 710 is rendered within estimation system 108. Step 914 executes by determining first variable consumable use 810 for first variable content 710. Step 916 executes by adding first variable consumable use 810 to the total variable consumable use, or variable consumable estimate 716. Flowchart 900 proceeds to step 932, disclosed below.

If step 908 is yes, then the content is static content, which is treated differently than variable content. Estimation system 108 determines that the content includes metadata tagged thereto. Static content may have been rendered previously during processing of a PDF file such that estimation system 108 does not have to perform rendering. Thus, step 920 executes by determining whether the static content is saved or stored at estimation system 108.

If step 920 is no, then step 922 executes by identifying the content analyzed above as static content. For example, estimation system 108 may determine that the current content instance is second static content 706. Metadata 706A indicates that the content is reused. Thus, it is static content. Estimation system 108 then determines that second static content 706 does not have stored rendered data. Thus, estimation system 108 needs to render second static content 706.

Step 924 executes by rendering the static content for the identified object or content using RIP 714. For example, estimation system 108 renders second static content 706. Step 926 executes by determining the consumable use for the rendered static content. Using the above example, estimation system 108 determines second static consumable use 806. Step 930 executes by adding the consumable use for the static content to total static consumable use 814. Flowchart 900 then proceeds to step 932, disclosed below.

If step 920 is yes, then step 928 executes by retrieving the stored consumable use for the static content. For example, if second static content 706 was previously rendered, then its consumable use value should be stored within database 116 of estimation system 108. Step 930 then executes by adding the retrieved consumable use to total static consumable use 814. Using the above example, estimation system 108 determines second static content 706 has been rendered and retrieves second static consumable use 806 from database 116. The need to perform rendering operations using RIP 714 is avoided and the speed at which the consumable use may be estimated is accelerated.

Step 932 executes by determining whether the current object or content instance is the last one. As shown in PDF file 702, multiple objects of content may be within the document. If step 932 is no, then flowchart 900 returns to step 906 to continue processing remaining objects or content within PDF file 702. Thus, flowchart 900 will account for all instances of content within the PDF file. For example, after processing second static content 706, the disclosed embodiments will analyze third static content 708 and determine whether it is saved or not to add its consumable use estimate to the total static consumable use.

If step 932 is yes, then no more objects or content need to be analyzed and step 934 executes by calculating consumable use estimate 720 using total static consumable use 814 to determine static consumable estimate 718 and total variable consumable use 816 to determine variable consumable estimate 716. Estimation system 108 combines variable consumable estimate 716 and static consumable estimate 718 to determine consumable use estimate for PDF file 702.

Step 936 determines whether PDF file 702 is the last page in the document, or VDP print job 413. As disclosed above, VDP print job 413 may include thousands or even millions of items to print, such as single page flyers. Thus, step 936 asks if this is the final document, page, item, and the like to be processed for a consumable use estimate. If no, then flowchart 900 proceeds back to step 904 to move to the next PDF file. If step 936 is yes, then step 938 executes by compiling the consumable use estimates for all of the PDF files to determine an overall consumable use estimate for VDP print job 413.

Figure 10:
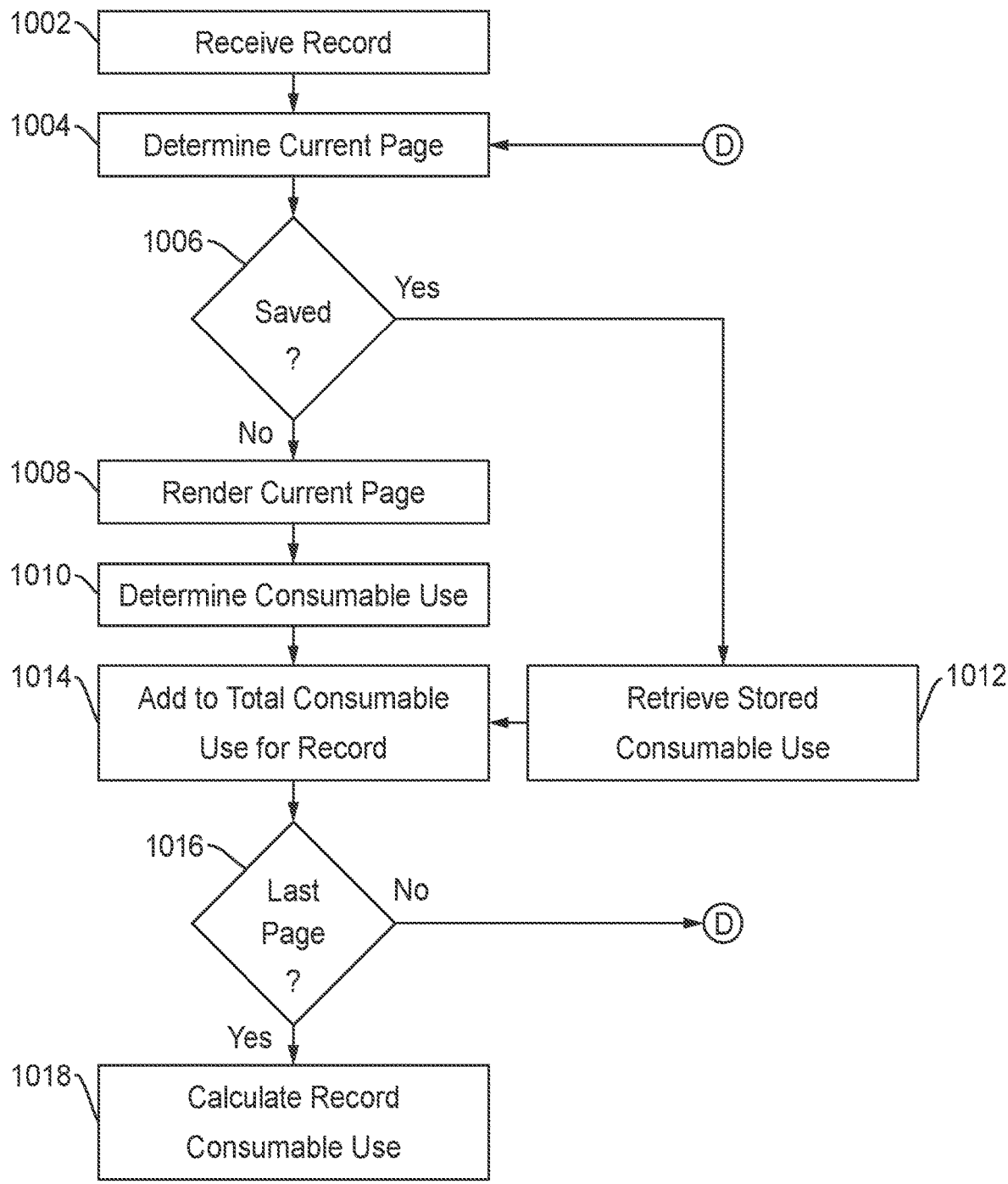
FIG. 10 illustrates a flowchart for accelerated consumable use estimation of documents having variable page numbers according to the disclosed embodiments.

FIG. 10 depicts a flowchart 1000 for accelerated consumable use estimation of documents having variable page numbers according to the disclosed embodiments. Flowchart 1000 may refer to FIGS. 1A to 9 for illustrative purposes. Flowchart 1000, however, is not limited to the disclosure of the embodiments shown by FIGS. 1A to 9.

In some embodiments, VDP print job 413 may include a specified number of pages of static content, but each record may use a different subset of these pages to have documents with varying number of pages. The consumable use estimate should take into account these differences. For example, VDP print job 413 may include 20 pages of static content. Each record may not use all 20 pages of content and have sizes of 12, 15, 16, 18, or 20 pages. Consumable use estimation should be done per page such that the consumable use for the pages used within each record are added to the consumable use totals. This process may be shown above in flowchart 900, where pages are substituted for objects or content, and it is determined whether the page is rendered already so that its consumable use may be retrieved.

Flowchart 1000 shows these embodiments in more detail. Step 1002 executes by receiving a record of VDP print job 413. Using the above disclosure, a record may be similar to PDF file 702 in that it has multiple instances of objects or content. In some embodiments, the pages of the record may be treated as static content, such that a first page is similar to first static content 704, a second page is similar to second static content 706, a third page is similar to third static content 708, and so on. Some pages may include variable content and treated differently than the static pages. These pages may be rendered accordingly, much like first variable content 710 and second variable content 712 disclosed above. In these embodiments, pages with no variable content may be tagged with metadata.

Step 1004 executes by determining the current page to be estimated from the record. For example, the record may include any number of pages to be printed. These pages may differ from other records in VDP print job 413. Step 1006 executes by determining whether the consumable use for the current page is saved at estimation system 108. For example, the current page may already be rendered in a previous operation and its consumable use determined.

If step 1006 is no, then step 1008 executes by rendering the current page of static content using RIP 714 at estimation system 108. The current page may be comparable to first static content 704 in that it is rendered by RIP 714 to first static consumable use 804. In the rendering, a dot count value 309 may be determined that is then used in step 1010, which executes to determine the consumable use for the current page. Using the above example, first static consumable use 804 is determined after the rendering of first static content 704. Flowchart 1000 then proceeds to step 1014.

If step 1006 is yes, then step 1012 executes by retrieving the stored consumable use for the current page. Using the above examples, if first static consumable use 804 is stored in database 116, then it is retrieved as opposed to rendering the static content again. Here, the consumable use already determined for the current page is retrieved. Step 1014 executes by adding the consumable use for the current page to the total consumable use for the record, much like first static consumable use 804 is added to total static consumable use 814.

Step 1016 executes by determining whether the current page is the last page of the record. If no, then flowchart 1000 returns to step 1004 to process the next page within the record. If step 1016 is yes, then step 1018 executes by calculating the total consumable use for the record using the compiled consumable use estimates of the pages processed using flowchart 1000. Flowchart 1000 does not process every available page used within VDP print job 413 for each record, but dynamically processes the actual pages. The estimation is accelerated using the disclosed embodiments to retrieve the estimated consumable use for reused content as determined.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for accelerated consumable use estimation in a printing system, the method comprising:
   receiving a request for a consumable use estimation at an estimation system connected to a printing device within the printing system;
   rendering variable content within a document for the print job;
   estimating a variable consumable estimate based on the variable content for the print job;
   determining static content within the document, wherein the static content is associated with a static consumable estimate stored at the estimation system based on the static contact being previously rendered;
   retrieving the static consumable estimate from the estimation system;
   processing the static consumable estimate for the static content within the document for the print job; and
   determining the consumable use estimate for the print job according to the variable consumable estimate and the static consumable estimate.

2. The method of claim 1, further comprising indicating the static content in the document, wherein the static content is reused in variable data printing operations.

3. The method of claim 2, wherein indicating the static content includes tagging the static content with metadata.

4. The method of claim 2, wherein indicating the static content includes automatically adding metadata to the document to indicate the static content.

5. The method of claim 1, wherein the static content includes an image.

6. The method of claim 2, further comprising generating a portable document format (PDF) layer for the static content within the document.

7. The method of claim 1, further comprising determining whether content within the document is static content according to metadata associated with the static content.

8. The method of claim 1, wherein the consumable use estimate includes an ink use estimate or a toner use estimate.

9. An estimation system for a printing system comprising:
   a processor;
   a memory connected to the processor, wherein the memory includes instructions to configure the processor to
   receive a request for a consumable use estimation for a print job to a printing device within the printing system;
   render variable content within a document for the print job;
   estimate a variable consumable estimate based on the variable content for the print job;
   determine static content within the document, wherein the static content is associated with a static consumable estimate stored at the estimation system based on the static contact being previously rendered;
   retrieve the static consumable estimate from the estimation system;
   process the static consumable estimate for the static content within the document for the print job; and
   determine the consumable use estimation for the print job according to the dynamic consumable estimate and the static consumable estimate.

10. The estimation system of claim 9, wherein the processor is further configured to indicate the static content in the document, wherein the static content is reused in variable data printing operations.

11. The estimation system of claim 10, wherein the processor is further configured to tag the static content with metadata.

12. The estimation system of claim 9, wherein the static content includes an image.

* * * * *